(12) United States Patent
Boland et al.

(10) Patent No.: US 6,674,484 B1
(45) Date of Patent: Jan. 6, 2004

(54) VIDEO SAMPLE RATE CONVERSION TO ACHIEVE 3-D EFFECTS

(75) Inventors: Liza G. Boland, New York, NY (US); Johan G. Janssen, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 512 days.

(21) Appl. No.: 09/593,839

(22) Filed: Jun. 14, 2000

Related U.S. Application Data

(60) Provisional application No. 60/175,189, filed on Jan. 10, 2000.

(51) Int. Cl.[7] ............... H04N 7/01; H04N 11/20; G09G 5/00; G06K 9/32
(52) U.S. Cl. ............... 348/580; 348/581; 348/578; 348/583; 348/561; 348/565; 345/582; 345/427; 382/294; 382/298
(58) Field of Search ............... 348/578, 580, 348/581, 583, 561–2, 565, 568, 448, 445; 345/419, 473, 582, 606, 660, 664, 665, 427, 607; 382/298, 296, 300, 294, 289

(56) References Cited

U.S. PATENT DOCUMENTS

| | | | | |
|---|---|---|---|---|
| 4,600,919 | A | | 7/1986 | Stern .................. 340/725 |
| 4,760,605 | A | * | 7/1988 | David et al. ............ 382/269 |
| 5,173,948 | A | | 12/1992 | Blackham et al. ........ 382/44 |
| 5,410,644 | A | | 4/1995 | Their et al. ............ 395/125 |
| 5,553,208 | A | | 9/1996 | Murata et al. .......... 395/125 |
| 5,729,673 | A | * | 3/1998 | Cooper et al. .......... 345/427 |
| 5,945,996 | A | * | 8/1999 | Migdal et al. .......... 345/420 |
| 6,002,446 | A | * | 12/1999 | Eglit .................. 348/581 |
| 6,057,851 | A | | 5/2000 | Luken et al. ........... 345/430 |
| 6,226,417 | B1 | * | 5/2001 | Yamagata et al. ....... 382/289 |
| 6,266,452 | B1 | * | 7/2001 | McGuire .............. 382/294 |
| 6,339,434 | B1 | * | 1/2002 | West et al. ............ 345/667 |
| 6,351,573 | B1 | * | 2/2002 | Schneider ............. 382/294 |
| 6,424,351 | B1 | * | 7/2002 | Bishop ................ 345/582 |
| 6,437,828 | B1 | * | 8/2002 | Chambers et al. ....... 348/458 |
| 6,442,283 | B1 | * | 8/2002 | Tewfik et al. .......... 382/100 |

FOREIGN PATENT DOCUMENTS

| | | |
|---|---|---|
| EP | 0637813 A2 | 2/1995 |
| EP | 0804022 A1 | 10/1997 |

* cited by examiner

Primary Examiner—Michael H. Lee
Assistant Examiner—Paulos Natnael
(74) Attorney, Agent, or Firm—Laurie E. Gathman

(57) ABSTRACT

The two dimensional sample rate conversion capabilities of a video display system are used to produce three-dimensional effects. Linear and non-linear scaling is applied to a video image to convey a sense of depth. The three dimensional effects are used to increase the visual appeal of existing and new feature sets in display systems. A multi-faceted object representation, such as a representation of a cube or a pyramid, can be used to display different video images on each facet of the representation. By appropriately scaling each image on each facet, an impression of depth is achieved. The images on the different facets can be selected to represent different aspects of a common theme, such as datacast information related to a primary source of information. Channel changing on a television can be presented as a rotation of the multifaceted object. In like manner, other familiar representations, such as a representation of a book can be used, wherein channel changing is presented as a turning of the pages of the book, each television program being presented on a different page. Advanced features, such as program categorization, can be represented as tabs on the book that facilitate the selection of a particular category. In like manner, a rotation of a multifaceted object about one axis may correspond to a change of channel within a select category, whereas a rotation about another axis may correspond to a change of category. Techniques are presented for achieving these three dimensional effects with calculations that are well suited for execution via the sample rate converters of conventional display systems.

18 Claims, 7 Drawing Sheets

VIDEO SAMPLE RATE CONVERSION TO ACHIEVE 3-D EFFECTS

This application claims the benefit of U.S. Provisional Application No. 60/175,189, filed Jan. 10, 2000.

BACKGROUND OF THE INVENTION

1. Field of the Invention

This invention relates to the field of video signal processing, and in particular to the creation of 3-D effects via video sample rate conversion.

2. Description of Related Art

High quality video display systems, such as high definition television (HDTV) systems, are becoming increasingly popular, and therefore increasingly cost and feature competitive. To remain competitive, a system must offer more functionality, or be more attractive to a purchaser, or have other features that distinguish the system from other systems. Preferably, these features are provided at substantially the same cost as systems without these features, so that the combination of features and price facilitate an increase in market share, or profits, or both.

One such distinguishing feature among systems is, for example, a "picture-in-picture" (PIP) capability, wherein a second video image can be superimposed upon a primary video image. When initially offered, PIP capable televisions commanded a higher selling price. Competing systems thereafter offered additional PIP features, such as user-controllable sizing and positioning of the PIP image on the display. Following computer interface paradigms, television systems are currently available that offer "windowing" features, wherein different video images can be displayed in different windows on the television display. The video images can be other television program images, a channel selection guide, or communications related to a primary image, such as a window that contains ancillary information about the program being viewed, a detailed view of an item that is advertised for sale, and so on. Televisions that provide these capabilities often provide a higher profit margin than less capable televisions, particularly when the capability is new, because often the additional cost to add the feature is low, but the demand for the feature is high.

In like manner, providers of Internet-based television can be expected to compete for viewers, in order to allow them to command higher advertising prices. If a particular television display system provides a desirable feature, the providers of the Internet service will provide programs that are capable of using the feature, thereby increasing the demand for that provider's service, as well as an increased demand for display systems that include the feature.

To achieve the aforementioned PIP and windowing video effects, each video image must be scaled to fit the allocated display area for the image. In a digital display system, sample rate converters (SRCs) are used to effect the scaling. A digitally encoded video image comprises an array of samples of the original image; a display screen area comprises an array of pixels. If the number of samples in the horizontal and vertical direction are equal to the number of pixels in the horizontal and vertical direction, no scaling is necessary. Each sample is mapped to each corresponding pixel, and the resultant displayed image corresponds to the original image. If there are half the number of pixels as there are samples, every other sample is mapped to a corresponding pixel. The resultant image corresponds to an image that is sampled at half the sampling rate of the original samples. That is, a change of scale is equivalent to a change of sampling rate, hence the term 'sample rate converter'. Non-integer scaling is effected by generating pixel values corresponding to an estimate of the sample value that would have been obtained had the original sampling rate corresponded to this display scale. These generated pixel values are typically obtained by interpolating the value from a set of samples about each pixel location. Conventional display systems include both a vertical sample rate converter and a horizontal sample rate converter to effect the scaling in either or both dimensions.

Computer graphic systems are available that can produce visual effects on a display screen that convey a concept of depth perception, or three dimensional imaging. These graphic systems use complex graphic accelerator devices to achieve this three dimensional effect. The graphics accelerator devices, however, are not directly compatible with conventional video rendering systems, and are not yet able to meet the quality demands of conventional video display systems. The cost of a graphics accelerator device that can be used to produce three-dimensional effects in a video display system can be expected to substantially increase the cost of the display system.

BRIEF SUMMARY OF THE INVENTION

It is an object of this invention to provide additional features for video display systems. It is a further object of this invention to provide a video display system with three-dimensional effects. It is a further object of this invention to provide three-dimensional effects on a video display system without substantially increasing the cost of the system.

These objects and others are achieved by using the two dimensional sample rate conversion capabilities of a video display system to produce three-dimensional effects. Linear and non-linear scaling is applied to a video image to convey a sense of depth. The three dimensional effects are used to increase the visual appeal of existing and new feature sets in display systems. A multi-faceted object representation, such as a representation of a cube or a pyramid, can be used to display different video images on each facet of the representation. By appropriately scaling each image on each facet, an impression of depth is achieved. The images on the different facets can be selected to represent different aspects of a common theme, such as datacast information related to a primary source of information. Channel changing on a television can be presented as a rotation of the multifaceted object. In like manner, other familiar representations, such as a representation of a book can be used, wherein channel changing is presented as a turning of the pages of the book, each television program being presented on a different page. Advanced features, such as program categorization, can be represented as tabs on the book that facilitate the selection of a particular category. In like manner, a rotation of a multifaceted object about one axis may correspond to a change of channel within a select category, whereas a rotation about another axis may correspond to a change of category. Techniques are presented for achieving these three dimensional effects with calculations that are well suited for execution via the sample rate converters of conventional display systems.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

This invention enhances the presentation of video images by adding three-dimensional (3-D) effects to the rendering of the image. As contrast to graphic processors that render 3-D object images onto a 2-D plane, this invention adds a third dimension to a conventional 2-D video image. That is, an object in a graphics system includes length, width, and depth information, as well as three-dimensional coordinates in an object space that defines where each object is located. The graphics system performs the necessary operations to discern a projection of 3-D objects onto the 2-D image plane of a display, including determinations as to the size and shape of each object's projection, relative to an assumed viewer, determinations as to which objects block the view of other objects, and so on. In this invention, the source of information is a two-dimensional image. A third dimension is added to the two-dimensional video image by treating the image as an image plane, and emulating a rotation, or other change of orientation, of the image plane relative to the plane of the display screen. A region of the image plane that is conceptually farther from the viewer because of this rotation is rendered at a smaller scale than a region that is conceptually closer to the viewer, thereby conveying a sense of 'depth' to the rotated image. As discussed below, this emulation of depth is effected via a modification to the control and operation of the horizontal and vertical sample rate converters of conventional high quality video systems.

Figure 1:
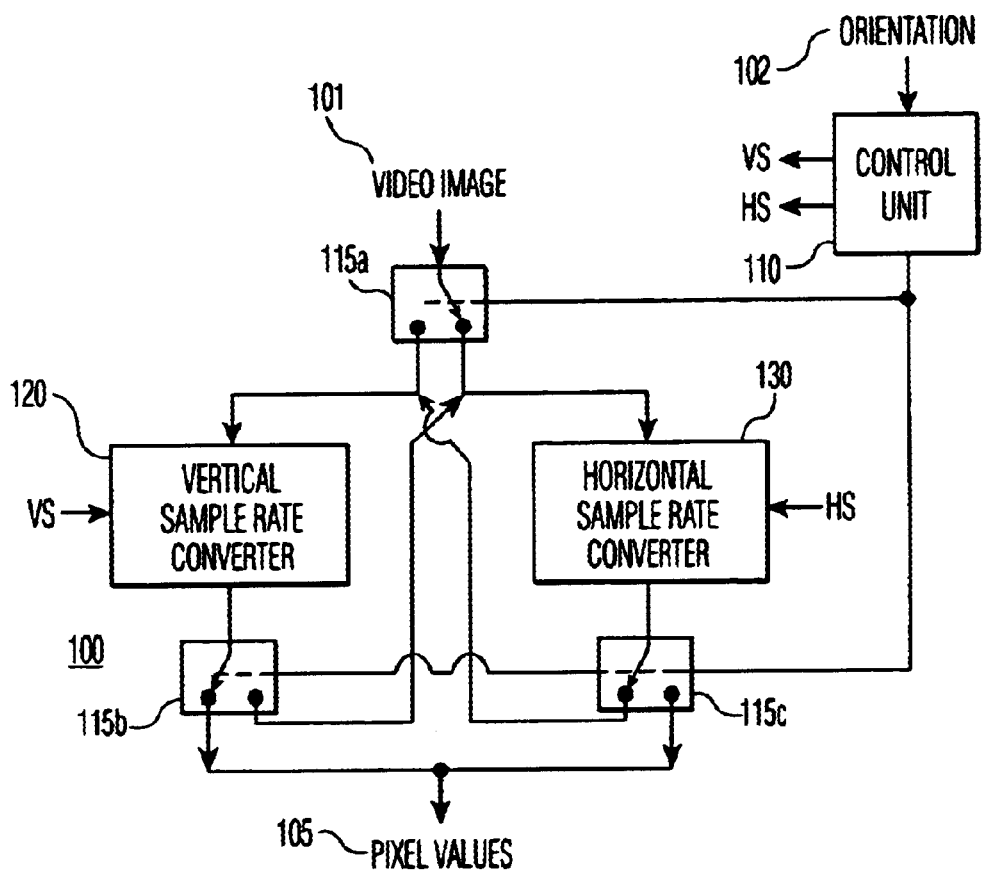
FIG. 1 illustrates an example block diagram of a 3-D scaler in accordance with this invention.

FIG. 1 illustrates an example block diagram of a 3-D scaler 100 in accordance with this invention. As illustrated, the 3-D scaler 100 comprises a control unit 110, a vertical sample rate converter 120 and a horizontal sample rate converter 130. Note that the paradigm of scaling via sample rate converters is used herein for ease of understanding, because sample rate converters are commonly used to effect scaling, as discussed above. It will be evident to one of ordinary skill in the art in view of this disclosure that any other scaling means can be employed to effect the same visual results, and are included in the intended scope of this invention.

The sample rate converters 120 and 130 operate similarly to conventional sample rate converters that are used to scale video images in the vertical and horizontal direction, except as detailed below. The control unit 110 controls the flow of data through the converters 120, 130, via the switches 115a–c. The control unit 110 also provides vertical and horizontal scaling factors, VS and HS, to control the degree of scaling provided by the vertical 120 and horizontal 130 sample rate converters. The operation of the scaler 100 is best understood with reference to the example flow diagram of FIG. 3, and the resultant effects on the rendering of a video image, as illustrated in FIGS. 4A–4E, and 5A–5C.

Figure 3:
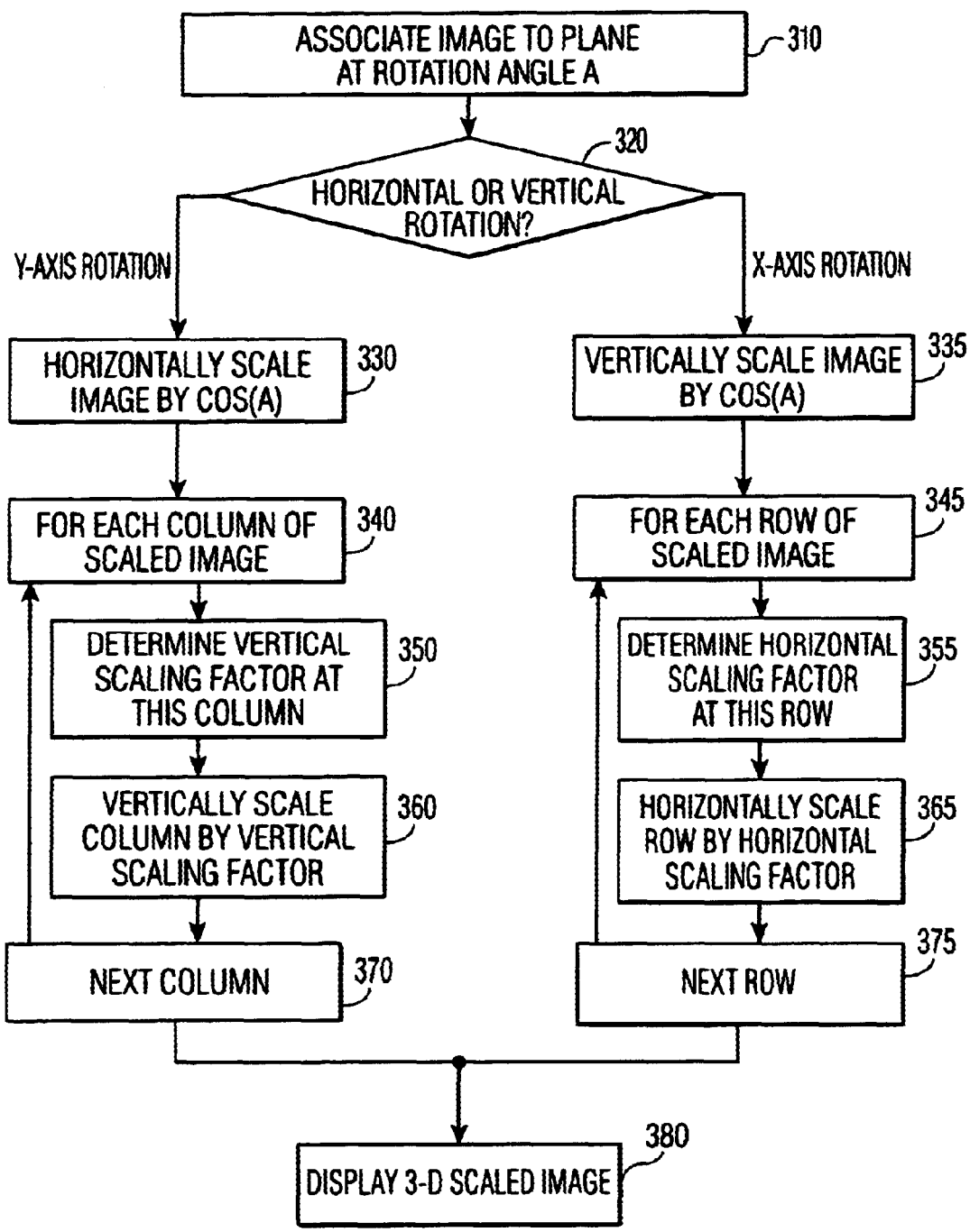
FIG. 3 illustrates an example flow diagram of a 3-D scaler in accordance with this invention.

FIG. 3 illustrates an example flow diagram of a 3-D scaler, such as the scaler 100 of FIG. 1, in accordance with this invention. Note that, for ease of reference, reference numerals that are between 100 and 199 refer to items in FIG. 1, whereas reference numerals between 300 and 399 refer to items in FIG. 3. At 310, an input video image 101 is associated with a rotation, or orientation 102, angle A. At 320, the flow branches in two, depending upon whether the rotation is relative to the vertical axis or the horizontal axis. This branching corresponds to the control of the switches 115a–c by the control unit 110 of FIG. 1. The setting of the switches 115a–c that is illustrated in FIG. 1 corresponds to a rotation about the y, or vertical, axis, and corresponds to the left set of steps in FIG. 3 after the branch at 320.

Figure 4A:
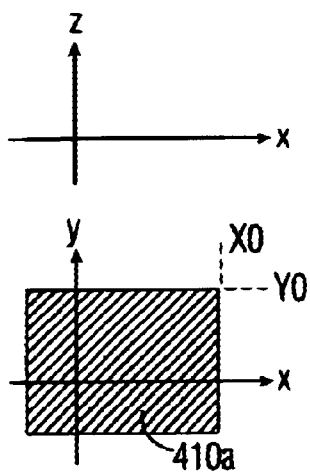
FIGS. 4A–4E, and 5A–5C illustrate example perspective renderings in accordance with this invention.
Figure 4B:
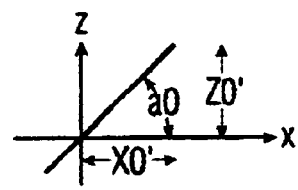
Figure 4B:
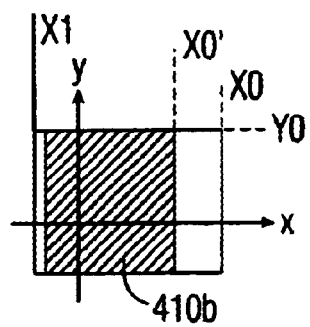

As is known in the art, a rotation of a plane about the y-axis can be represented by the following transformation:

$$x'=x^*\cos(A)-z^*\sin(A) \tag{1}$$

$$y'=y \tag{2}$$

$$z'=x^*\sin(A)+z^*\cos(A) \tag{3}$$

where x, y, and z are the coordinates within the plane before the rotation, and x', y', and z' are the resultant coordinates after the rotation about the y-axis through an angle A. In this coordinate system, z corresponds to a distance "away" from the viewer, such that a positive z coordinate is farther away from the user than a zero or negative coordinate. For ease of understanding, the initial z value assigned to the image is assumed to be zero, although one of ordinary skill in the art will recognize that if a non-zero z is used, the $z^*\sin(A)$ term merely translates each x' coordinate by a fixed amount, and could be represented by a translation block after the horizontal scaling block 320. Note that the horizontal scaling of each x coordinate is by the same scaling factor, $\cos(A)$. In the example embodiment of FIG. 1, this scaling factor HS is provided by the control unit 110 to the horizontal sample rate converter 130, and the converter 130 scales the input video image 101 by this factor HS. FIGS. 4A–4B illustrate a scaling of an image 410a by a scaling factor corresponding to a rotation about an angle a0 to form a horizontally scaled image 410b. In FIG. 4B, the extent X0' of the scaled image 410b is equal to the extent X0 of the original image 410a multiplied by the cosine of the orientation angle a0 relative to the plane of the original image 410a. Note that this horizontal scaling as a function of the orientation angle a0 achieves the foreshortening of an image that occurs when the image is viewed from an angle, but does not convey a sense of depth.

To represent depth, a perspective rendering is provided in accordance with this invention. In a perspective rendering, objects that are farther from a viewer appear smaller than when they are closer to the viewer. In general, a perspective rendering is a linear transformation:

$$s1=s0^*d0/d1, \tag{4}$$

where s0 represents an apparent size of an object at a distance d0, and s1 represents an apparent size of the same object at a distance d1. Often, the distance d0 is referred to as the focal distance to the original image. In the context of this disclosure, the distance d0 is equal to an assumed focal distance, f, of a viewer from the original image plane, and the distance d1 is the resultant distance from the viewer caused by the introduction of a z-component by the emulated rotation of the image from the original image plane: d1=f+z'. Thus, equation 4 can be rewritten as:

$$x''=x'^* f/(f+z'). \tag{5}$$

$$y''=y'^* f/(f+z'). \tag{6}$$

As equations 5 and 6 indicate, both the x coordinates and the y coordinates should be scaled as a function of the distance z' that is introduced by the rotation of the image. That is, each image sample must be scaled in both the x and y dimensions as a function of the z coordinate, or depth, of each sample in the rotated image.

Figure 4C:
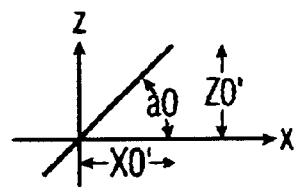
Figure 4C:
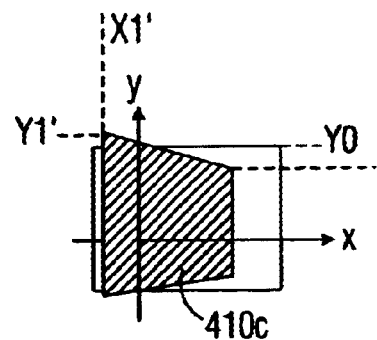

In accordance with one aspect of this invention, to reduce processing time, it has been determined that a scaling in the axis that is opposite to the axis that is foreshortened by the rotation of the image plane is sufficient to convey a sense of depth. For example, in FIG. 4B, the farthest extent X0' of the rotated image 410b is farther away from the viewer by a distance of Z0'. To produce an effect corresponding to a perception of depth in accordance with this aspect of the invention, the vertical size Y0 of the farthest extent X0 of the image 410b is scaled by a factor of f/(f+Z0') to produce a reduced vertical size Y0' as illustrated in FIG. 4C. Each y coordinate is similarly scaled, producing the sloped upper and lower edges of the image 410c. Note that although the x coordinates of FIG. 4C are unchanged from the foreshortened view FIG. 4B, a sense of depth is created by the scaling of the y coordinates as a function of the distance z. Also note that in FIG. 4C, the closest extent X1' of the rotated image is closer to the viewer than the original image plane, and thus the vertical size Y1' corresponding to a scaling by f/(f+Z1') is larger than the original vertical size at this nearer extent, because the sign of Z1 is negative in the convention used herein.

With regard to FIG. 1, this scaling of the y-coordinates as a function of distance from the viewer is effected by routing the output of the horizontal sample rate converter 130 to the vertical sample rate converter 120, via switch 115c, and scaling by a vertical scaling factor VS that varies as a function of the determined depth parameter, z, of each coordinate of the rotated figure. Note that in a rotation about the y-axis, the z coordinate value is constant for each column of constant x coordinate values. The control unit 110 provides a vertical scale VS(x) to the vertical sample rate converter 120 for each column (discrete x value) of the rotated figure, corresponding to equation 6 above. As illustrated in the loop 340–370 of FIG. 3, the vertical sample rate converter 120 applies this scale value VS(x) for each horizontally scaled image value in a column, then applies the next scale value VS(x+1) to the next column of the horizontally scaled image values, and so on, until all of the vertical coordinates of the horizontally scaled image are scaled based on the perception depth factor f/(f+z). After the horizontal and vertical scaling, the pixel values resulting from this emulation of a three dimensional rotation of the original image are presented for display, at 380. As would be evident to one of ordinary skill in the art, optimization techniques can be applied in this process. For example, to reduce the number of divisions required to compute the perception factor (f/(f+z)) the scale of the closest and the farthest columns can be determined, and the scale factor of the intermediate columns can be determined by interpolation.

Figure 4D:
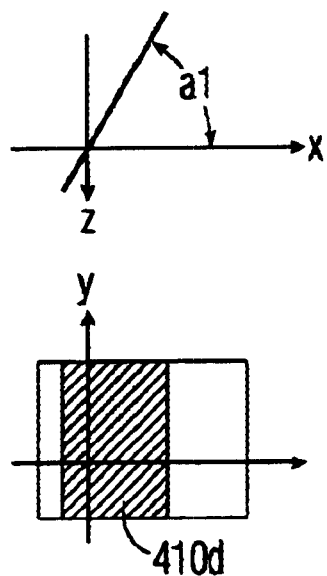
Figure 4E:
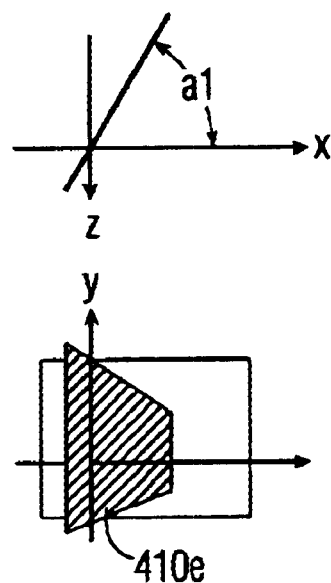

FIGS. 4D and 4E illustrate a rotation of the image 410a through a larger angle a1. As discussed above, FIG. 4D corresponds to a horizontal scaling of the image 410a by a constant scale factor corresponding to cos(a1), and FIG. 4E corresponds to a vertical scaling of the horizontally scaled image 410d by a scale factor that varies as a function of the distance from the original image plane, corresponding to f/(f+z). As illustrated, a progression from FIG. 4A to FIG. 4C to FIG. 4E will convey a sense of rotation of the image through a three dimensional space.

Figure 5A:
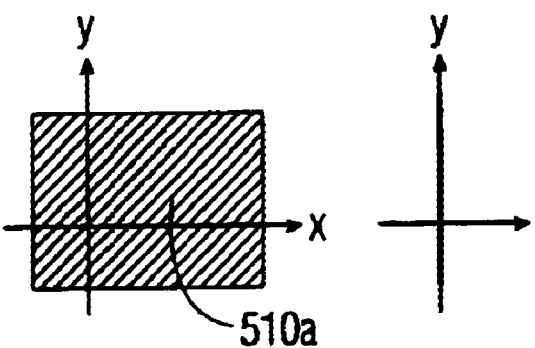
Figure 5B:
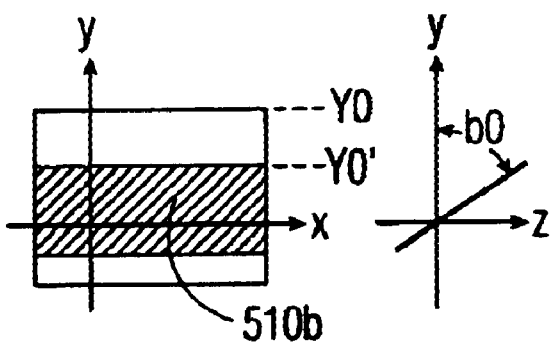
Figure 5C:
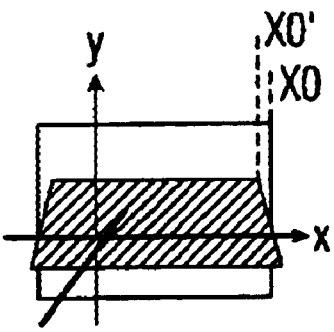

FIGS. 5A–5C illustrate an example rotation of an image 510a through the x-axis, and corresponds to the flow illustrated on the right hand side of FIG. 3 after 320. As is known in the art, a rotation about the x-axis results in the following transformation of coordinates:

$$x'=x \quad (7)$$

$$y'=y*\cos(A)+z*\sin(A) \quad (8)$$

$$z'=-y*\sin(A)+z*\cos(A) \quad (9)$$

where z has the sense (sign) corresponding to a distance away from a viewer, discussed above. As illustrated, the image 510a is initially scaled in the vertical dimension by a constant scale factor that corresponds to cos(b0) to produce the shortened image 510b of FIG. 5B, corresponding to block 335 of FIG. 3.

As discussed above, the opposite axis from the one that is initially scaled by the constant scale value is subsequently scaled by a scale factor that varies as a function of the z-coordinate, or depth introduced by the rotation, corresponding to equation 5, above. That is, each row of the rotated image values of the image 510b is scaled by a different horizontal scaling factor, to produce the sloped horizontal edges of the image 510c in FIG. 5C. These sloped edges produce the desired visual effect of a rotation of the image 510a about the horizontal axis.

The control unit 110 of FIG. 1 effects the above process by switching the switches 115a–c to the opposite state of the state illustrated in FIG. 1. Thereby, the video image 101 is routed, via 115a, to the vertical sample rate converter 120, and is scaled by the vertical sample rate converter 120 using a constant vertical scale factor VS from the control unit 110. Thereafter, the vertically scaled image is routed, via 115b, to the horizontal sample rate converter 130. The horizontal sample rate converter 130 scales each horizontal row of the scaled image using a horizontal scale factor HS that is determined by the control unit 110 for each row, based on the z-dimension of each row, and based on a given focal distance, f.

It is significant to note that, in accordance with this invention, the control unit can effect a variety of perspective renderings, via a control of the horizontal and vertical scaling parameters HS and VS that are provided to horizontal and vertical sample rate converters that substantially correspond to sample rate converters currently used in high quality video systems. In this manner, the 3-D effects discussed above, and others, can be achieved with a minimal additional cost. Note also that the constant-scaling in one dimension aspect of this invention is provided to reduce the required processing, while still conveying a perspective effect. As processing power continues to increase, the control unit 110 can be easily reconfigured to effect a varying scale in both sample rate converters 120, 130, regardless of the axis of rotation, to implement both equations 5 and 6 for each processed image. Note also that the particular order of processing the image (horizontal scale then vertical scale for a rotation about the y-axis, and a vertical scale then horizontal scale for a rotation about the x-axis) is presented for ease of understanding, and for efficient processing. Because the scaling in each dimension is independent of the other, the scaling by each sample rate converter 120, 130 can be effected in either order.

The scaling that is effected to produce a 3-D effect can be combined with other techniques as well. For example, the horizontal and vertical sample rate converters 120, 130 are conventionally provided in order to scale a video image to an allocated display area. In a preferred embodiment, the scale factors used to scale the image to the desired size are combined with the 3-D scaling factors. That is, if a factor K1 is the horizontal scale factor required to scale the original image to the pixels of the display area, the scaling factor that is used in equation 1 is K1*cos(A), and in equation 5, the scaling factor is K1*f/(f+z).

The principles of this invention can also be applied to effect a rotation about the z-axis, which is, in effect a 2-D operation. As is known in the art, a rotation about the z-axis of an angle A results in the following transformation of coordinates:

$$x'=x*\cos(A)-y*\sin(A), \quad (10)$$

$$y'=x*\sin(A)+y*\cos(A). \quad (11)$$

It can be shown that these equations can be transformed into a serial process. The first stage of this process is a vertical scaling:

$$x'=x, \quad (12)$$

$$y'=x*\sin(A)+y*\cos(A). \quad (13)$$

The second stage of this process is a horizontal scaling of the vertically scaled coordinates:

$$x''=x'*\sec(A)-y'*\tan(A), \quad (14)$$

$$y=y'. \quad (15)$$

To effect a z-axis rotation, therefore, the control unit 110 routes, via 115a, the original image to the vertical sample rate converter 120, and provides a vertical scale factor corresponding to cos(A), then adds the x-dependent translation component (x*sin(A)) to each column of image coordinates. One of ordinary skill in the art will recognize this operation as a vertical shearing of the original image. This vertically sheared image is then routed, via 115b to the horizontal sample rate converter 130, with a horizontal scale factor corresponding to sec(A). Thereafter, a y-dependent translation component (y*tan(A)) is subtracted from the vertically sheared image. This horizontal scaling and translation corresponds to a horizontal shearing. The result of this dual shearing process corresponds to a 2-D rotation of the image.

The equations 10 and 11 can also be transformed into a horizontal shearing followed by a vertical shearing. To avoid anomalous effects as the angle A approaches 90 degrees, the control unit 110 is configured to effect a transposition to effect a 90 degree rotation, then rotates the transposed image by an angle of 90-A degrees, using the techniques presented above.

Note that this sequential shearing process can be combined with the aforementioned conventional scaling to scale the image to an allocated display area, and can be combined with the aforementioned rotations about the x and y axes, thereby producing a helix-like visual effect, and other effects. As will be evident to one of ordinary skill in the art, other effects can also be realized via suitable mathematical transformations, such as an emulation of a sphere, or other complex shape, having one or more images presented as being rendered on the shape's surface.

Figure 2:
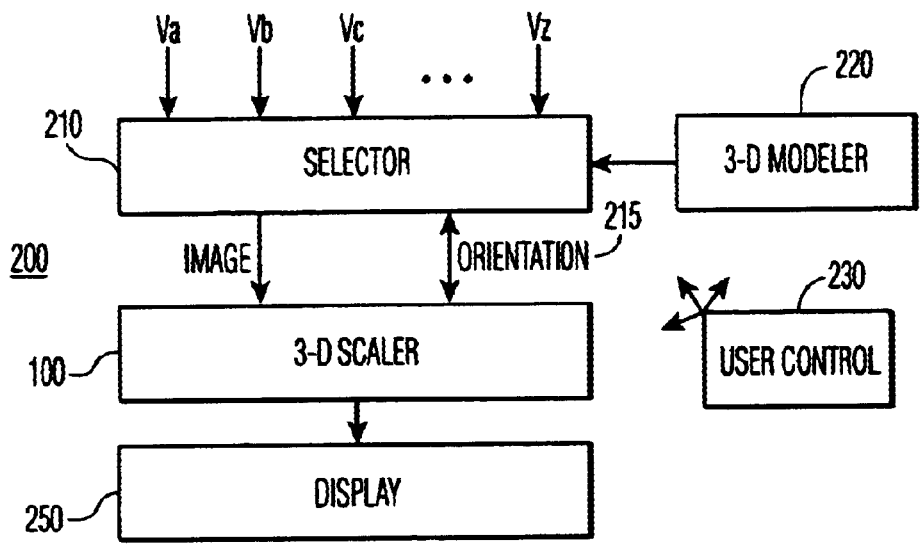
FIG. 2 illustrates an example block diagram of a video display system in accordance with this invention.

The emulation of 3-D effects on a video image can be used to provide a variety of visually enhanced features in a video display system. FIG. 2 illustrates an example block diagram of a video display system in accordance with this invention. As is common in the art, a high-quality video display system allows for the selection, via a selector 210, from multiple video image sources Va, Vb, Vc, etc., for simultaneous display on a display 250. For example, a common Picture-In-Picture television system allows the simultaneous display of images from two video image sources. A common multi-media computer system allows for the simultaneous display of images in discrete windows, limited only by the availability of inputs, the bandwidth of the sources, and the performance of the computer system.

In accordance with this invention, the 3-D scaler 100 presented above is used to introduce 3-D effects on one or more of the selected images, typically in response to a user control 230. For example, in response to a channel-change command from a user, the selector 210 and scaler 100 can be configured to "rotate" one channel's image away, while it rotates the next channel's image in. That is, the sequence of FIGS. 4A, 4C, 4E could be used to have the first channel displayed as an image that is rotating substantially away from the user. When the rotation angle reaches 90 degrees, the selector can be configured to provide the second channel to the scaler 100, as the image plane continues to rotate toward 180 degrees. In this manner, the second channel image will appear to have been on the "reverse side" of the image plane containing the first channel image. Similarly, in a multi-channel system, the system can be configured to initiate the display of a next-channel while the current channel is being displayed; this subsequent display may be initiated upon the current image being rotated by a predefined angle. Similarly, the orientation angle of the next-image can be directly correlated to the angle of the current image, such as an angle of 90-A, thereby emulating images that are orthogonal to each other. Other effects can also be provided. For example, a channel-up command by the user can effect a rotation in one direction, while a channel-down can effect a rotation in the opposite direction. In like manner, a jump to a specified channel can be emulated as a rotation about the opposite axis to the one used for incremental channel selection. The implementation of these and other 3-D visual effects will be evident to one of ordinary skill in the art in view of this disclosure.

FIGS. 6A–B, 7, and 8A–B are example effects that can be realized by the principles of this invention. These examples are presented for illustration purposes, and are not intended to imply a limitation of the scope of this invention to these examples. These examples illustrate the use of a 3-D modeler 220 for configuring the orientations and relationships among a variety of rendered images to achieve a coherent visual effect.

Figure 6A:
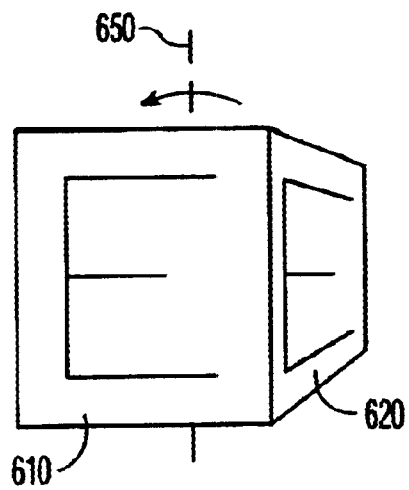
FIGS. 6A–6B, 7, and 8A–8B illustrate example 3-D object renderings in accordance with this invention.

FIG. 6A illustrates what appears to be two sides of a three dimensional block. A first image 610 is rendered so as to appear on a surface of the three dimensional block that is coincident with the image plane, and a second image 620 is rendered so as to appear to be on a surface of the three dimensional block that is oblique to the image plane. This representation could provide an alternative to a "windowed" picture-in-picture display, wherein the oblique image is the secondary image. This representation could be a multi-image picture-in-picture image that appears within a larger primary image, and allows the user to simultaneously view two PIP images while viewing the primary image. The representation may also be a primary image 610 with ancillary, or "datacast", information 620 related to the image, such as the credits, biographies of the performers in the primary image, and so on. In the e-commerce arena, the alternate image 620 may be information regarding ordering a product that is being advertised in the image 610. The advantageous uses of multiple image presentations are common in the art; this invention provides a means of providing such multiple image presentations in a more visually interesting form than static two-dimensional presentations.

Figure 6B:
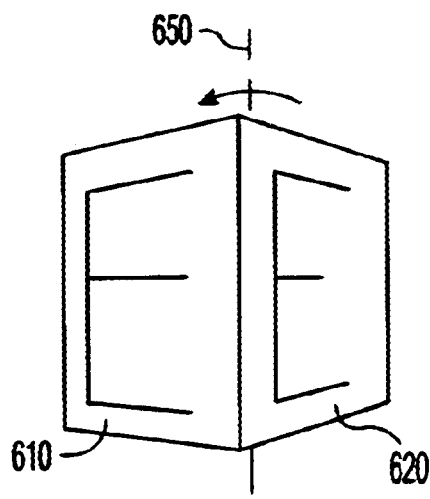

FIG. 6B illustrates a rotation of the representation of the three dimensional block. Note that in this example, the rotation is about an axis 650 that has a z-component that does not correspond to the plane of the original image 610, and thus the rotation introduces both a horizontal scaling as well as a horizontal displacement of the image, thereby further increasing the perception of depth. That is, the images 610 and 620 travel to the left as the block is rotated about the indicated direction about the axis 650, while at the same time, the image 610 continues to shrink as its angle to the viewing plane increase, and the image 620 continues to expand. Note that a variety of user interfaces may be employed to effect this rotation. As in the prior example, a channel-up or channel-down command can effect a rotation of the block to bring the secondary image 620 into a primary viewing plane, replacing image 610 in the final orientation of FIG. 6A, such that an image from another source is brought into view at the location of image 620 in FIG. 6A. Alternatively, a pointing device may be available, such that when the user points to and selects the image 620 in FIG. 6A, the video system 200 effects the rotation illustrated in FIG. 6B. That is, the impression could be that a three dimensional object moves in response to a channel selection, or that a channel selection is achieved in response to an interaction with the three dimensional object, as illustrated by the bi-direction "orientation" arrow 215 of FIG. 2 between the selector 210 and the 3-D scaler 100. These and other user interfaces will be evident to one of ordinary skill in the art in view of this disclosure.

Figure 7:
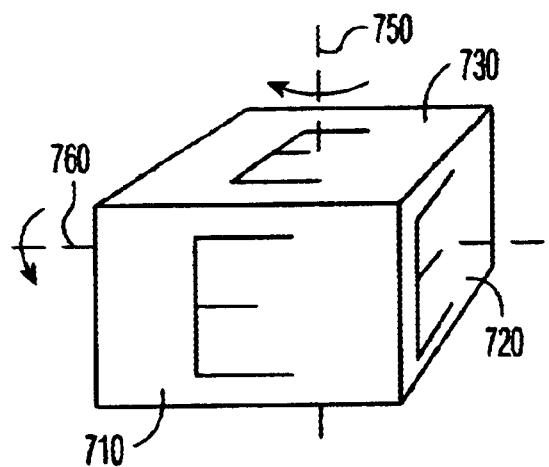

FIG. 7 illustrates a representation of a three-dimensional block wherein three surfaces are within view, and images 710, 720, 730 appear to be projected upon these surfaces. As above, the three images could be three different television programs, three different scenes from a DVD player, a primary image and supplemental images that relate to the primary image, and so on. This example illustrates a varying vertical scaling of image 720, and a varying horizontal scaling of image 730. The user control 230 controls the selector 210 and scaler 100 to facilitate a rotation of the representation of the three-dimensional block about either a vertical axis 750 or a horizontal axis 760. The alternative axis could correspond to different selection mechanisms. For example, advanced user interfaces for televisions include means for categorizing the choice of programs available at the time of viewing, such as "news", "sports", "comedy", and so on. In a preferred embodiment of this invention, a rotation about one axis corresponds to a selection within a category, such as a change of channel to the next news program, whereas a rotation about the other axis corresponds to a change of category.

Figure 8A:
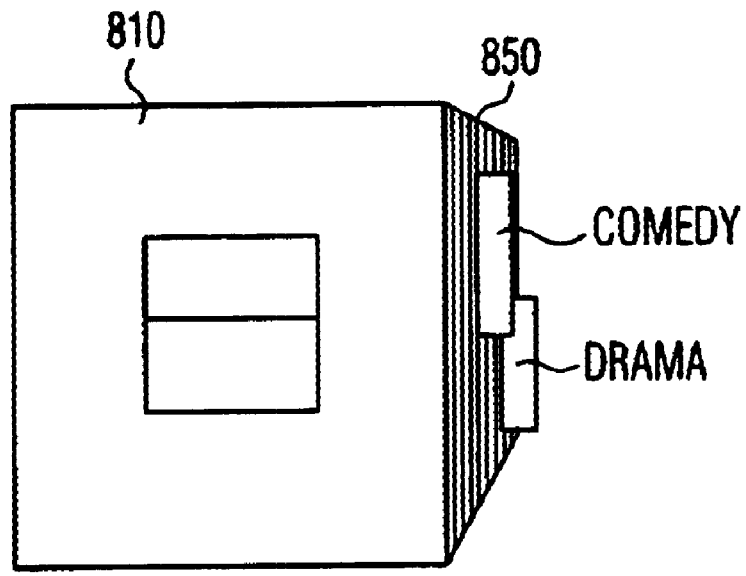
Figure 8B:
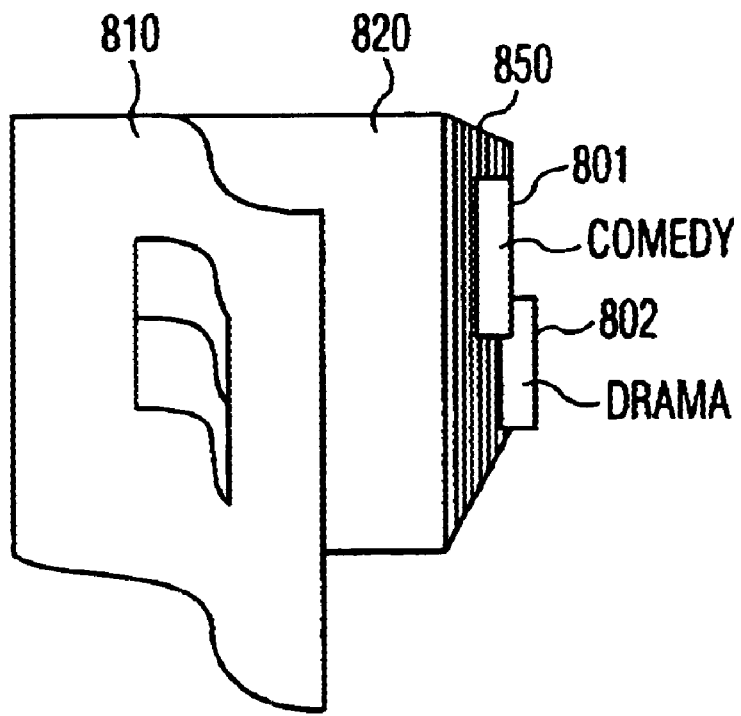

Although this invention has been presented with regard to simple three-dimensional objects, such as the blocks of FIGS. 6A, 6B, and 7, other representations can be employed to further increase the visual appeal of a video display system. The determination of the z-coordinate for a given representation of a three dimensional object can be extended beyond the equations 1–3 and 7–9 given above. One of ordinary skill in the art of computer graphics will be able to define other representations that are suitable for implementation in the control unit 110 of FIG. 1 for emulating a three dimensional transformation of an image plane. FIG. 8A, for example, illustrates an image 810 that appears to be a page in a book 850. When a new image is selected for viewing, the video system 200 emulates a turning of the page to reveal a new image 820, as illustrated in FIG. 8B. Following the book analogy further, the book 850 is illustrated as having "tabs" 801, 802 that facilitate a selection from different "sections" of the book, such as a "comedy" section, a "drama" section, and so on. When the user selects a given tab, or selects a given category, the video system 200 provides an emulation of a turning of multiple pages to display the first page (video image) at that tab, or within that category.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A video display system comprising:

a horizontal scaler that is configured to scale an input video image in a horizontal direction, a vertical scaler that is configured to scale the input video image, in a vertical direction, a controller, operably coupled to the horizontal and vertical scalers, that is configured to effect a scaling of the input video image via the horizontal and vertical scalers that corresponds to a perspective rendering of the input video image, wherein the perspective rendering is achieved by applying a varying scale factor to at least one of the horizontal and vertical scalers to render the input video image, and a source of multiple input video images, wherein the controller is further configured to selectively render at least two input video images of the multiple input images to form a composite perspective rendering corresponding to a representation of a three dimensional object.

2. The video display system of claim 1, further including a user control that facilitates a change of orientation of the representation of the three dimensional object, thereby effecting a change of the perspective renderings of each input video image.

3. The video display system of claim 2, wherein the change of orientation corresponds to a change of selection of input video images from the source of multiple input video images.

4. The video display system of claim 2, wherein the change of orientation of the representation corresponds to a rotation of the three dimensional object about a select axis.

5. The video display system of claim 2, wherein the representation of the three dimensional object corresponds to a representation of a book comprising multiple pages, and the change of orientation of the representation corresponds to a turning of a page of the multiple pages.

6. The video display system of claim 2, wherein the user control facilitates a change of orientation via a plurality of orientation controls, each orientation control corresponding to a different set of input video images from the source of multiple video images, and each change of orientation corresponding to a change of selection of input video images from the corresponding set of input video images.

7. The video display system of claim 1, wherein at least one video input image corresponds to information that relates to at least one other video input image of the multiple video images.

8. The video display system of claim 1, wherein the three dimensional object includes a plurality of facets, and each of the at least two input video images is rendered upon a corresponding facet of the plurality of facets.

9. A method of rendering a plurality of video images on a display surface, comprising:

associating each video image of the plurality of video images with a surface of a representation of a three dimensional object, and for each video image:

determining a rotation scale corresponding to an angle of the corresponding surface relative to the display surface, scaling the video image based on the rotation scale to produce an array of scaled image values, determining a perception scale corresponding to a depth of each scaled image value of the array of scaled image values relative to the display surface, and scaling each scaled image value based on the perception scale to produce an array of pixel values corresponding to the video image.

10. The method of claim 9, wherein the scaling of the video image corresponds to a select one of a vertical sample rate conversion and a horizontal sample rate conversion of the video image, and the scaling of each scaled image values corresponds to an opposite one of the vertical and horizontal sample rate conversion from the select one.

11. The method of claim 9, further including enabling a user control that facilitates a change of orientation of the representation of the three dimensional object, thereby effecting a change of at least one of the rotation scale and the perception scale.

12. The method of claim 11, further including modifying the plurality of video images in dependence upon the change of orientation of the representation of the three dimensional object.

13. A program that is configured to be stored in a memory for execution by a processing device, the program being configured to:

enable an association of a video image to a surface of a representation of a three dimensional object, enable a determination of a rotation scale corresponding to an angle of the surface relative to a display surface, enable a scaling of the video image based on the rotation scale to produce an array of scaled image values, enable a determination of a perception scale corresponding to a depth of each scaled image value of the array of scaled image values relative to the display surface, and enable a scaling of the scaled image values based on the perception scale to produce an array of pixel values corresponding to the video image.

14. The program of claim 13, wherein the scaling of the video image corresponds to a select one of a vertical sample rate conversion and a horizontal sample rate conversion of the video image, and the scaling of each scaled image values corresponds to an opposite one of the vertical and horizontal sample rate conversion from the select one.

15. The program of claim 13, further including enabling a user control that facilitates a change of orientation of the representation of the three dimensional object, thereby effecting a change of at least one of the rotation scale and the perception scale.

16. The program of claim 14, further including enabling a modification of the plurality of video images in dependence upon the change of orientation of the representation of the three dimensional object.

17. The method of claim 9, further including displaying the three dimensional object in a form having a plurality of facets; and displaying each video image of the plurality of video images on one facet of the plurality of facets of the three dimensional object.

18. The program of claim 13, further including displaying the three dimensional object in a form having a plurality of facets; and displaying each video image of the plurality of video images on one facet of the plurality of facets of the three dimensional object.

* * * * *